UNITED STATES PATENT OFFICE.

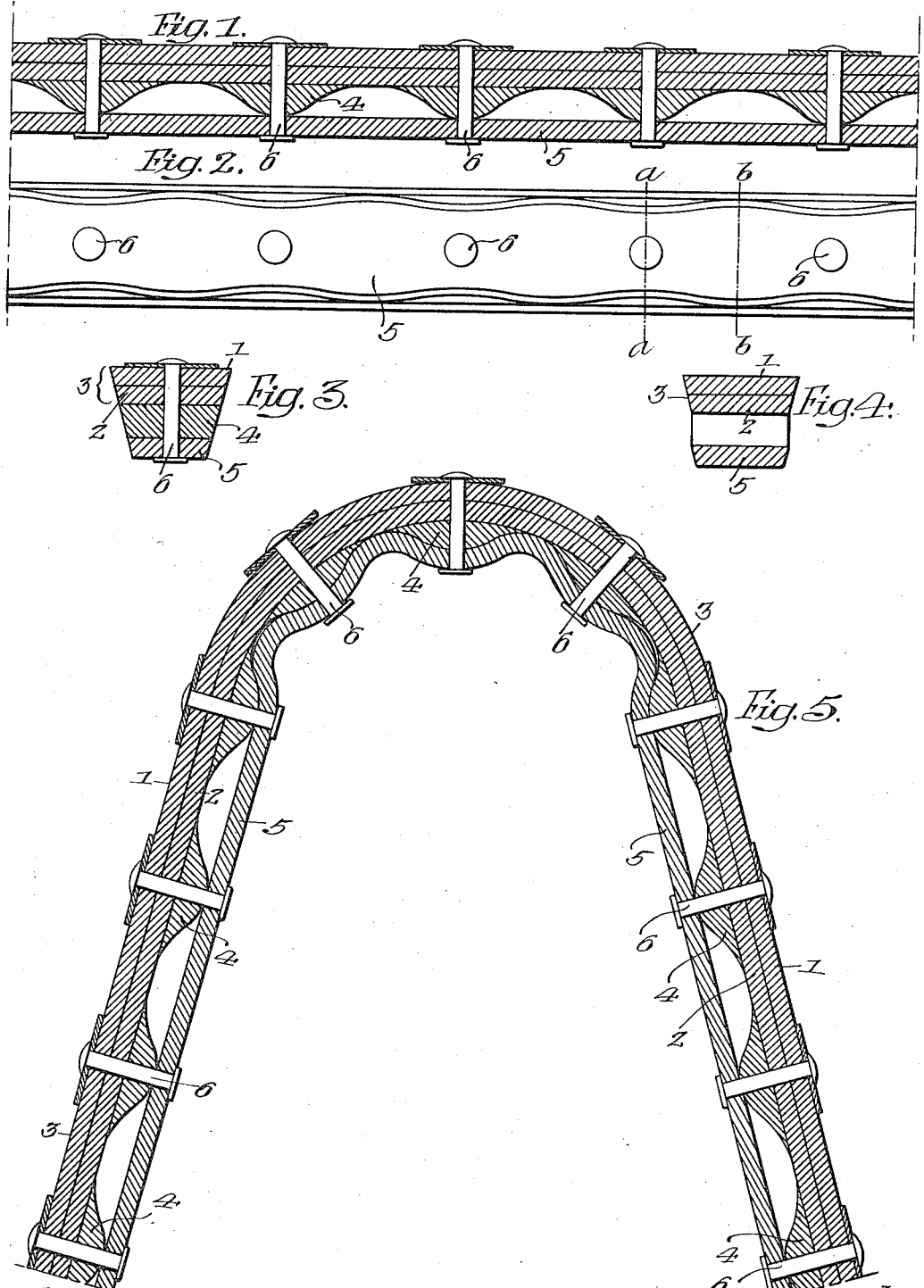

JOSEPH EDGAR RHOADS, OF WILMINGTON, DELAWARE.

POWER-TRANSMISSION BELT.

1,030,682.   Specification of Letters Patent.   Patented June 25, 1912.

Application filed April 19, 1912. Serial No. 691,813.

*To all whom it may concern:*

Be it known that I, JOSEPH EDGAR RHOADS, a citizen of the United States, residing in Wilmington, Delaware, have invented certain Improvements in Power-Transmission Belts, of which the following is a specification.

One object of my invention is to provide a belt such as that commonly used for transmitting power between the driving and the driven members of a motor cycle or other driven vehicle, which shall be more efficient than those at present known to the art by reason of a novel arrangement of parts whereby it shall present a maximum engaging surface to the small pulley as well as to the larger pulley around which it passes.

I further desire to provide a power transmission belt built up of a number of sections and substantially trapezoidal in cross section which shall have such a form that its edges will continuously engage the side walls of the smaller of the two pulleys with which it is customarily used as well as the walls of the groove of the larger pulley, in order to prevent the slipping which frequently occurs on the smaller pulley.

These objects and other advantageous ends I secure as hereinafter set forth, reference being had to the accompanying drawings in which, Figure 1 is a vertical section of a substantially straight run of a belt constructed according to my invention; Fig. 2 is an inverted plan of a part of the belt shown in Fig. 1; Figs. 3 and 4 are transverse sections on the lines *a—a* and *b—b* respectively of Fig. 2; and Fig. 5 is a section taken in the central plane of the belt, illustrating it with its several parts in the positions occupied while passing around the smaller of the two pulleys with which it is customarily used.

In the above drawings, 1 and 2 represent the two outer layers of the belt which are preferably cemented or otherwise connected so as to form in effect a single endless band 3, constituting the body of the belt. This body is preferably trapezoidal in cross section and has mounted upon its inner or narrower face a series of similarly shaped blocks 4 also trapezoidal in cross section and curved in longitudinal outline as indicated in Figs. 1 and 5. The summits or narrow tops of these curved blocks or pieces are joined by a continuous band 5 connected to them and to the body of the belt by a series of rivets 6, one of which passes centrally through each of said blocks. It is to be especially noted that the band 5 varies in width as shown in Fig. 2, being narrowest opposite each of the rivets and thereafter gradually broadening to an amount depending on the shape of the groove and the diameter of the smaller of the two pulleys on which the belt is to be used. With this construction and arrangement of parts the belt at each of the rivets 6 has a trapezoidal cross section as shown in Fig. 3, which is similar in form and dimensions to the pulley grooves in which the belt operates. As is shown in Fig. 5, when the belt passes around a relatively small diameter pulley, the inner band or layer 5 is caused to assume the corrugated form illustrated in Fig. 5, and if said band were of uniform width, it is obvious that its edges could engage the walls of the groove in the small pulley for limited portions only thereof immediately adjacent the rivets 6, for the reason that the outwardly curved parts of said band between said rivets, being farther from the center of the pulley, would not be of sufficient width to engage the wall of the groove. However, if this inner band be made as illustrated in Fig. 2, so as to have an increased width between the blocks 4 and the rivets, then when it is given the corrugated form shown in Fig. 5 in passing around a small diameter pulley, the increased width is sufficient to cause its edges to continuously grip the walls of the pulley groove from points opposite one rivet and its block to similar points opposite the next block. There is thus provided a materially increased engaging surface between the small diameter pulley and the belt passing around the same and consequently a greater amount of power can be transmitted from said pulley to a belt of given dimensions.

It will be understood that the leather or other material of the band 5 is sufficiently flexible to properly accommodate itself to the shape of the groove of the larger pulley, although owing to the blocks 4 it will be held in proper form to continuously engage the wall of the smaller pulley groove as heretofore described.

I claim:

1. The combination in a power transmission belt of an endless body portion; a series of blocks mounted on one face of said body portion; and a band extending between and connecting the summits of said blocks; said band varying in width between each pair of blocks.

2. The combination in a power transmission belt of a body portion having a series of blocks on its inner face; and a structure mounted adjacent said blocks and formed to have its edges engage the divergent walls of a pulley groove when in a corrugated form.

3. The combination in a power transmission belt of a body portion; a series of projections mounted on the inner face thereof; and a band extending between said projections; said belt being substantially trapezoidal in section adjacent each projection and the band increasing in width from each projection to points midway between it and the adjacent projection.

4. The combination in a power transmission belt of a body portion; a series of blocks mounted on one face thereof; an endless band connecting said blocks; and a series of rivets respectively passing through the body, the band and the blocks; said band increasing in width from a minimum adjacent each rivet to a maximum midway between each pair of rivets.

In testimony whereof, I have signed my name to this specification, in the presence of two subscribing witnesses.

JOSEPH EDGAR RHOADS.

Witnesses:
WILLIAM E. BRADLEY,
JOS. H. KLEIN.